(12) United States Patent
Wilson et al.

(10) Patent No.: US 12,277,052 B2
(45) Date of Patent: Apr. 15, 2025

(54) AUTOMATIC RELEASE PREPARATION AND DEPLOYMENT FOR SOFTWARE APPLICATIONS

(71) Applicant: FMR LLC, Boston, MA (US)

(72) Inventors: Winny Wilson, Apex, NC (US); Jeremy Jones, Trophy Club, TX (US)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 18/132,525

(22) Filed: Apr. 10, 2023

(65) Prior Publication Data

US 2024/0338309 A1    Oct. 10, 2024

(51) Int. Cl.
G06F 11/36   (2025.01)
G06F 8/65    (2018.01)
G06F 8/77    (2018.01)
G06F 11/3668 (2025.01)

(52) U.S. Cl.
CPC .......... *G06F 11/3688* (2013.01); *G06F 8/65* (2013.01); *G06F 8/77* (2013.01)

(58) Field of Classification Search
CPC .... G06F 8/60; G06F 11/3688; G06F 11/3664; G06F 8/65; G06F 8/77; G06F 11/3409; G06F 11/3668
See application file for complete search history.

(56) References Cited

U.S. PATENT DOCUMENTS

| | | | |
|---|---|---|---|
| 10,108,533 B1 | 10/2018 | Parasuraman et al. | |
| 10,157,044 B2 | 12/2018 | Khazanchi et al. | |
| 10,289,539 B1* | 5/2019 | Arguelles | G06F 11/3664 |
| 11,157,253 B1 | 10/2021 | Shteyman et al. | |
| 11,340,870 B2 | 5/2022 | Jubran et al. | |
| 11,422,789 B2 | 8/2022 | Chen et al. | |
| 2014/0045597 A1* | 2/2014 | Fernandez | G06F 11/3672 717/125 |
| 2016/0350107 A1* | 12/2016 | Bragg, Jr. | H04L 67/10 |
| 2017/0269921 A1* | 9/2017 | Martin Vicente | G06F 11/3668 |
| 2017/0372247 A1 | 12/2017 | Tauber et al. | |
| 2021/0279050 A1 | 9/2021 | Chen | |
| 2022/0222052 A1* | 7/2022 | Watt | G06F 8/71 |
| 2024/0111632 A1* | 4/2024 | Ramadas | G06F 11/1458 |

* cited by examiner

*Primary Examiner* — S. Sough
*Assistant Examiner* — Cheneca Smith
(74) *Attorney, Agent, or Firm* — Cesari and McKenna, LLP

(57) ABSTRACT

Methods and apparatuses are described for automatic release preparation and deployment for software applications. A server generates a candidate release build of selected software applications to be deployed to a production computing environment, including: building application artifacts associated with the applications and storing the application artifacts in a repository, updating a project configuration file associated with the applications, and creating a release branch associated with the applications. The server deploys the application artifacts of the candidate release build into a functional acceptance test computing environment and validates operation of the application artifacts. The server promotes the application artifacts to a performance acceptance test computing environment and validates operation of the application artifacts in the performance acceptance test computing environment The server promotes the application artifacts to a production computing environment when operation of the application artifacts is validated in the performance acceptance test computing environment.

26 Claims, 8 Drawing Sheets

AUTOMATIC RELEASE PREPARATION AND DEPLOYMENT FOR SOFTWARE APPLICATIONS

TECHNICAL FIELD

This application relates generally to methods and apparatuses, including computer program products, for automatic release preparation and deployment for software applications.

BACKGROUND

Most medium and large technology organizations develop and deploy software applications to production computing environments on a regular basis. In many cases, these software applications are at least partially reliant on open-source technology stacks—which can require significant manual effort to plan, build, and release the software applications. Current build and release management tools do not offer end-to-end solutions for build generation, testing, and deployment that also include robust user interface functionality to streamline the release activity workflow. Often, existing software release tools are not able to establish dependencies between different software components in an automated fashion. This can cause delays and errors in deployment, along with requiring repeated version updates.

The challenges with release deployment are further complicated by the management of release planning and execution across multiple development teams. With many different developers and teams working on various aspects of a particular software application—including issue tracking, change management tickets, development stories, source code check-ins, and the like—in combination with the technical requirements for application deployment (e.g., cloud vs. backend, hardware platform, lifecycle of application, etc.), it is very difficult to automatically deploy and validate the functionality of the software application build to multiple different testing computing environments and production computing environments while also being able to efficiently oversee the functional and performance testing of the application.

SUMMARY

Therefore, what is needed are methods and systems that provide for systematic software application release preparation and deployment, including automation of data and dependency collection and validation analysis for each code release and provision of a user interface that can make software application release validation and deployment to multiple different testing and production computing environments simple to execute and review. In some aspects, the techniques described herein can validate a given software application release and automatically promote the application to multiple different testing environments prior to deployment of the application to production—which enables development teams to improve the accuracy and reliability of the software testing process, while also understanding problem areas for applications and prevent production computing environment issues that result from deployment of deficient software. Also, the systems and methods described herein can advantageously automate the software deployment process—so that applications ready to be deployed are introduced into production while applications that are not ready are automatically blocked from deployment. As a result, the systems and methods of the present disclosure beneficially capture application performance and functionality information at many different stages of software development and testing and in several different testing environments. The captured information is retained at each deployment level and ready to be retrieved via user interface, and the capability is designed such a way that future compliance requirements can be quickly and efficiently integrated into the system, so as to avoid being limited to current tools and compliance efforts.

The invention, in one aspect, features a system for automatic release preparation and deployment for software applications. The system includes a server computing device with a memory that stores computer-executable instructions and a processor that executes the computer-executable instructions. The server computing device generates a candidate release build of one or more selected software applications to be deployed to a production computing environment, including: building one or more application artifacts associated with the selected software applications and storing the application artifacts in a software repository, updating a project configuration file associated with the selected software applications in a software project management system, and creating a release branch associated with the selected software applications in a source code management system. The server computing device deploys the application artifacts of the candidate release build into a functional acceptance test computing environment. The server computing device validates operation of the application artifacts in the functional acceptance test computing environment based upon results of one or more tests executed against the application artifacts in the functional acceptance test computing environment. The server computing device promotes the application artifacts from the functional acceptance test computing environment into a performance acceptance test computing environment when operation of the application artifacts is validated in the functional acceptance test computing environment. The server computing device validates operation of the application artifacts in the performance acceptance test computing environment based upon results of one or more tests executed against the application artifacts in the performance acceptance test computing environment. The server computing device promotes the application artifacts from the performance acceptance test computing environment to a production computing environment when operation of the application artifacts is validated in the performance acceptance test computing environment, including marking the application artifacts as ready for deployment to the production computing environment.

The invention, in another aspect, features a computerized method of automatic release preparation and deployment for software applications. A server computing device generates a candidate release build of one or more selected software applications to be deployed to a production computing environment, including: building one or more application artifacts associated with the selected software applications and storing the application artifacts in a software repository, updating a project configuration file associated with the selected software applications in a software project management system, and creating a release branch associated with the selected software applications in a source code management system. The server computing device deploys the application artifacts of the candidate release build into a functional acceptance test computing environment. The server computing device validates operation of the application artifacts in the functional acceptance test computing environment based upon results of one or more tests executed against the application artifacts in the functional acceptance test computing environment. The server computing device promotes the application artifacts from the functional acceptance test computing environment into a performance acceptance test computing environment when operation of the application artifacts is validated in the functional acceptance test computing environment. The server computing device validates operation of the application artifacts in the performance acceptance test computing environment based upon results of one or more tests executed against the application artifacts in the performance acceptance test computing environment. The server computing device promotes the application artifacts from the performance acceptance test computing environment to a production computing environment when operation of the application artifacts is validated in the performance acceptance test computing environment, including marking the application artifacts as ready for deployment to the production computing environment.

Any of the above aspects can include one or more of the following features. In some embodiments, a selection of the software applications to be deployed to a production computing environment is received from a client computing device. In some embodiments, generation of a candidate release build of the selected software applications is initiated automatically upon receiving the selection of the software applications from the client computing device.

In some embodiments, the server computing device deploys the application artifacts of the candidate release build into a functional integration test computing environment prior to deployment into the functional acceptance test computing environment. In some embodiments, the server computing device validates operation of the application artifacts in the functional integration test computing environment based upon results of one or more tests executed against the application artifacts in the functional integration test computing environment. In some embodiments, the server computing device prevents deployment of the application artifacts to the functional acceptance test computing environment when operation of the application artifacts in the functional integration test computing environment is not validated. In some embodiments, operation of the application artifacts in the functional integration test computing environment is not validated when one or more errors occurred during the tests executed against the application artifacts.

In some embodiments, the server computing device marks the application artifacts as not ready for deployment to the production computing environment and prevents promotion of the application artifacts to the production computing environment when operation of the application artifacts in the functional acceptance test computing environment is not validated. In some embodiments, operation of the application artifacts in the functional acceptance test computing environment is not validated when one or more errors occurred during the tests executed against the application artifacts.

In some embodiments, building one or more application artifacts associated with the selected software applications and storing the application artifacts in a software repository comprises identifying one or more application code objects for the selected software applications, determining a relationship between one or more of the application code objects and one or more libraries associated with the selected software applications, and integrating the application code objects and the related libraries into one or more application artifacts. In some embodiments, generation of the candidate release build is terminated when building of one or more of the application artifacts associated with the selected software application fails. In some embodiments, the server computing device generates a notification message for transmission to a client computing device when generation of the candidate release build is terminated. In some embodiments, promoting the application artifacts from the functional acceptance test computing environment to the production computing environment comprises transferring one or more files of the application artifacts to a computing device in the production computing environment and making functionality of the selected software applications available to one or more remote computing devices.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of an exemplary candidate release build dashboard graphical user interface provided by a UI module to a client computing device for management and initiation of candidate release build deployment.

FIG. 5 is a diagram of an exemplary graphical user interface provided by a UI module to a client computing device for tracking of deployment, testing, and promotion activities for a candidate release build.

DETAILED DESCRIPTION

Figure 1:
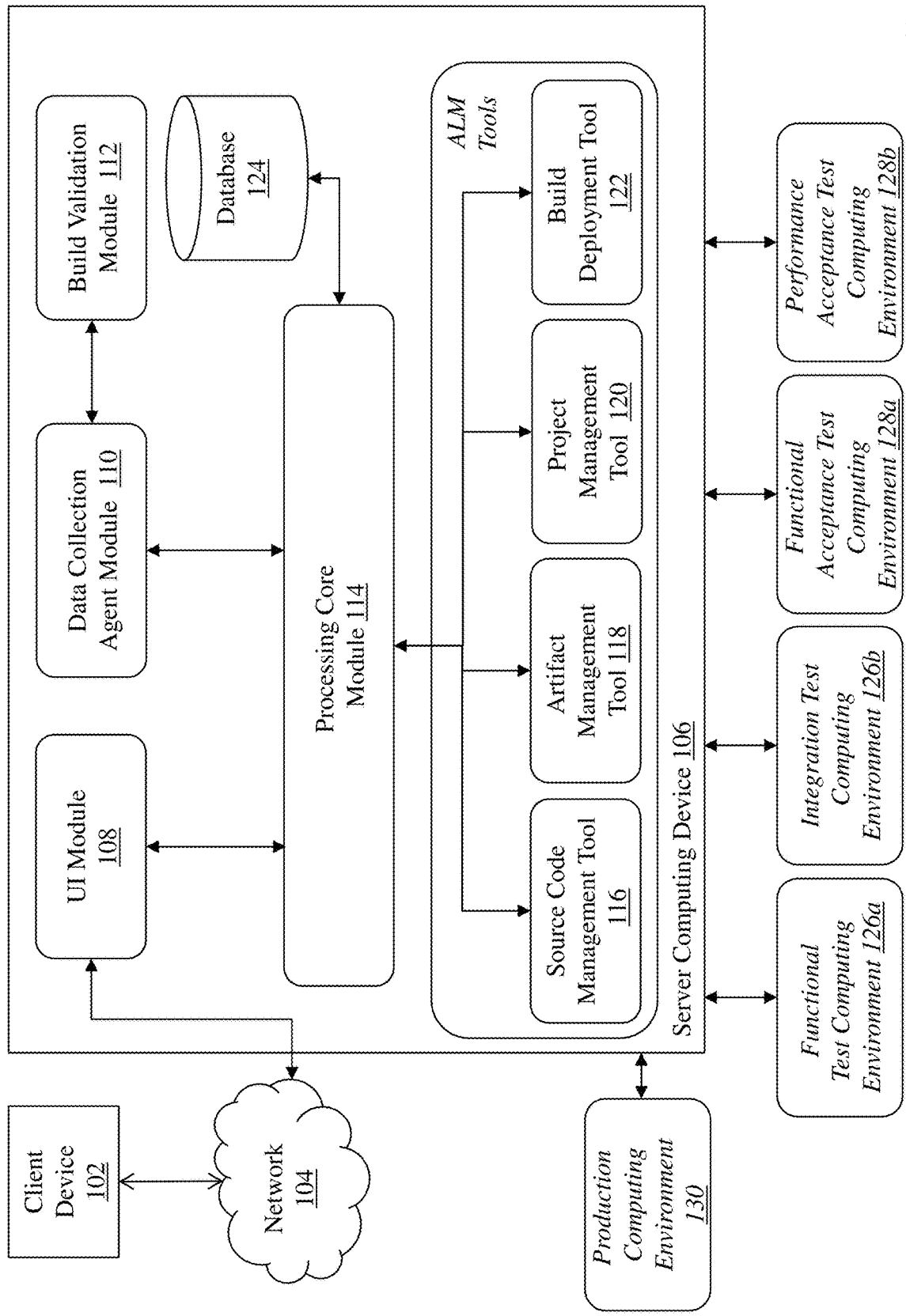
FIG. 1 is a block diagram of a system for automatic release preparation and deployment for software applications.

FIG. 1 is a block diagram of system 100 for automatic release preparation and deployment for software applications. As described herein, a 'software application' to be deployed to a testing computing environment and/or a production computing environment should be understood as including an entire executable application and/or certain elements of functionality (e.g., a module, a library, a code update) that is less than an entire executable software application. System 100 includes one or more client computing devices (e.g., client computing device 102) that is coupled via communications network 104 to server computing device 106. Server computing device 106 includes user interface (UI) module 108, data collection agent module 110, build validation module 112, processing core module 114, and application lifecycle management (ALM) tools 116, 118, 120, 122. Server computing device further includes database 124 and server computing device 106 is coupled to a plurality of computing environments, including functional test computing environment 126a, integration test computing environment 126b, functional acceptance (FAC) test computing environment 128a, performance acceptance (PAC) test computing environment 128b, and production computing environment 130.

Client computing device 102 connects to communications network 104 in order to communicate with server computing device 106 to provide input and receive output relating to the process of automatic release preparation and deployment for software applications as described herein. Client computing device 102 is coupled to a display device (not shown). For example, client computing device 102 can provide a detailed graphical user interface (GUI) via the display device that presents output resulting from the methods and systems described herein, where the GUI is utilized by an operator to review data associated with the process of automatic release preparation and deployment for software applications.

Exemplary client devices 102 include but are not limited to desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts a single client device 102, it should be appreciated that system 100 can include any number of client devices.

Communication network 104 enables the other components of system 100 to communicate with each other in order to perform the process of automatic release preparation and deployment for software applications as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of system 100 to communicate with each other.

Server computing device 106 is a combination of hardware, including one or more special-purpose processors and one or more physical memory modules, and specialized software modules—such as UI module 108, data collection agent module 110, build validation module 112, processing core module 114, and ALM tools (as shown in FIG. 1, source code management tool 116, artifact management tool 118, project management tool 120, and build deployment tool 122)—that execute on one or more processor(s) of server computing device 106, to receive data from other components of system 100, transmit data to other components of system 100, and perform functions for automatic release preparation and deployment for software applications as described herein.

In some embodiments, modules 108, 110, 112, 114 and tools 116, 118, 120, and 122 are specialized sets of computer software instructions programmed onto one or more dedicated processors in server computing device 106 and can include specifically designated memory locations and/or registers for executing the specialized computer software instructions. Further explanation of the specific processing performed by modules 108, 110, 112, 114 and tools 116, 118, 120, and 122 will be provided throughout the specification.

Generally and without limitation, source code management tool 116 is configured to store and manage source code files, components, and other elements of a software application under development in a defined repository. Source code management tool 116 can include features such as version control, peer code review, change tracking, and branch creation and management. In some embodiments, all or a portion of source code management tool 116 can be integrated within the server computing device 106 (as shown in FIG. 1) or be located on a separate computing device or devices. In some embodiments, source code management tool 116 is hosted on one or more remote computing devices (e.g., cloud-based architecture) that are accessible to server computing device 106 (e.g., via application programming interface (API)). Exemplary source code management tools 116 include, but are not limited to, GitHub™ (available at github.com), Bitbucket™ (available from Atlassian, Inc.), and Microsoft® Azure DevOps™ (available from Microsoft Corp.).

Generally and without limitation, artifact management tool 118 is configured to store and manage compiled software application builds, artifacts, libraries, binaries, packages, containers, components, and other elements that make up one or more software applications (e.g., such as those generated by build deployment tool 122 described below) and which can be deployed for execution in a computing environment. In some embodiments, all or a portion of artifact management tool 118 can be integrated within the server computing device 106 (as shown in FIG. 1) or be located on a separate computing device or devices. In some embodiments, artifact management tool 118 is hosted on one or more remote computing devices (e.g., cloud-based architecture) that are accessible to server computing device 106 (e.g., via application programming interface (API)). An exemplary artifact management tool 118 is JFrog™ Artifactory™ (available from jfrog.com).

Generally and without limitation, project management tool 120 is configured to organize and manage software development projects, including task assignments, roadmaps, bug and issue tracking, incident ticket management, project dependency and metadata control, project deployment status, and reporting. In some embodiments, all or a portion of project management tool 120 can be integrated within the server computing device 106 (as shown in FIG. 1) or be located on a separate computing device or devices. In some embodiments, project management tool 120 is hosted on one or more remote computing devices (e.g., cloud-based architecture) that are accessible to server computing device 106 (e.g., via application programming interface (API)). Exemplary project management tools 120 include, but are not limited to, Atlassian JIRA™ (available from Atlassian Inc.) and Apache Maven™ (available at maven.apache.org).

Generally and without limitation, build deployment tool 122 is configured to manage the automation of software application build generation (i.e., creating an executable version of a software application from the corresponding source code files and/or artifacts) and deploying the executable software application to one or more computing environments—including but not limited to functional test computing environment 126a, integration test computing environment 126b, FAC test computing environment 128a, PAC test computing environment 128b, and/or production computing environment 130. In some embodiments, all or a portion of build deployment tool 122 can be integrated within server computing device 106 (as shown in FIG. 1) or be located on a separate computing device or devices. In some embodiments, build deployment tool 122 is hosted on one or more remote computing devices (e.g., cloud-based architecture) that are accessible to server computing device 106 (e.g., via application programming interface (API)). Exemplary build deployment tools 122 include, but are not limited to, Jenkins™ (available from jenkins.io) or IBM® UrbanCode Deploy™ (uDeploy) (available from IBM Corp.).

In some embodiments, a plurality of tools 116, 118, 120, and 122 (or all of the tools) can be provided by the same application platform and may include features such as continuous integration/continuous deployment (CI/CD) integration with many different tools. For example, the Jenkins™ platform can provide functionality for facilitating CI/CD across building, testing, and deployment of software applications.

Database 124 comprises transient and/or persistent memory for data storage, that is used in conjunction with the process of automatic release preparation and deployment for software applications as described herein. In some embodiments, database 124 comprises a separate computing device (or in some embodiments, a plurality of separate computing devices) coupled to server computing device 106. Database 124 is configured to receive, generate, and store specific segments of data relating to the process of automatic release preparation and deployment for software applications as described herein. Database 124 can comprise one or more relational or non-relational databases configured to store portions of data used by the other components of system 100, as will be described in greater detail below.

Functional test computing environment 126a and integration test computing environment 126b are coupled to server computing device 106 and are configured to provide computing resources for deployment of one or more software applications in order to execute certain integration testing modules, scripts, and routines on the software applications. Generally, functional testing comprises a process to validate the functioning and operation of each feature and/or module of the software individually against corresponding functional requirements and/or specifications that are defined during the development process. Integration testing comprises a process to validate the functioning and operation of the features and/or modules of the software application when they are combined as a group. Typically, a software application under development is selected for deployment to functional test computing environment 126a and/or integration test computing environment 126b at a specific point in the software development lifecycle (e.g., when the application is considered feature complete). Once a build of the software application (including any related code files and/or artifacts) has been completed, the build can be promoted to functional test computing environment 126a and/or integration test computing environment 126b for testing. Generally, computing environments 126a, 126b comprise one or more physical and/or logical server computing devices (such as containers) that are located remotely from server computing device 106 (e.g., in a networked and/or cloud-based architecture). In some embodiments, one or more server computing devices that comprise computing environments 126a, 126b can be provided in the same physical location as server computing device 106.

Functional acceptance (FAC) test computing environment 128a and performance acceptance (PAC) test computing environment 128b are coupled to server computing device 106 and are configured to provide computing resources for deployment of one or more software applications in order to execute functional and/or performance acceptance testing on the software applications. Generally, functional acceptance testing comprises a process to assess whether the software application works appropriately for end users (i.e., user acceptance testing) and/or meets necessary business objectives (i.e., business acceptance testing) or regulatory requirements (e.g., regulations/compliance acceptance testing). Performance acceptance testing comprises a process to verify that the software application's performance (e.g., response time, scalability, etc.) is within desired parameters—this may also include security acceptance testing (e.g., verifying the software is secure against attacks and does not contain vulnerabilities) and/or regression acceptance testing (e.g., verifying that changes made to the software do not negatively affect existing unchanged features). Typically, a software application build is selected for deployment to functional acceptance test computing environment 128a and/or performance acceptance test computing environment 128b after the application build has passed functional testing and/or integration testing (although this is not required in all cases). Generally, computing environments 128a. 128b comprise one or more physical and/or logical server computing devices (such as containers) that are located remotely from server computing device 106 (e.g., in a networked and/or cloud-based architecture). In some embodiments, one or more server computing devices that comprise computing environments 128a. 128b can be provided in the same physical location as server computing device 106.

Production computing environment 130 is coupled to server computing device 106 and is configured to receive a software application build that has completed the testing process and provide the functionality associated with the software application build to end users. Typically, once a software application build is determined to be ready for release, server computing device 106 (via, e.g., build deployment tool 122) provides an executable software application build for deployment and installation in production computing environment 130. Generally, production computing environment 130 one or more physical and/or logical server computing devices (such as containers) that are located remotely from server computing device 106 (e.g., in a networked and/or cloud-based architecture). In some embodiments, one or more server computing devices that comprise production computing environment 130 can be provided in the same physical location as the server computing device 106. In some embodiments, system 100 may include a plurality of production computing environments 130—e.g., for different geographic region coverage, failover, mirroring, quality assurance, or other types of production environments.

Finally, it should be appreciated that the above-referenced ALM tools 116, 118, 120, 122 are exemplary, and that other types of ALM tools can be included in the system 100 for the purposes of automatic release preparation and deployment for software applications as described herein.

Figure 2:
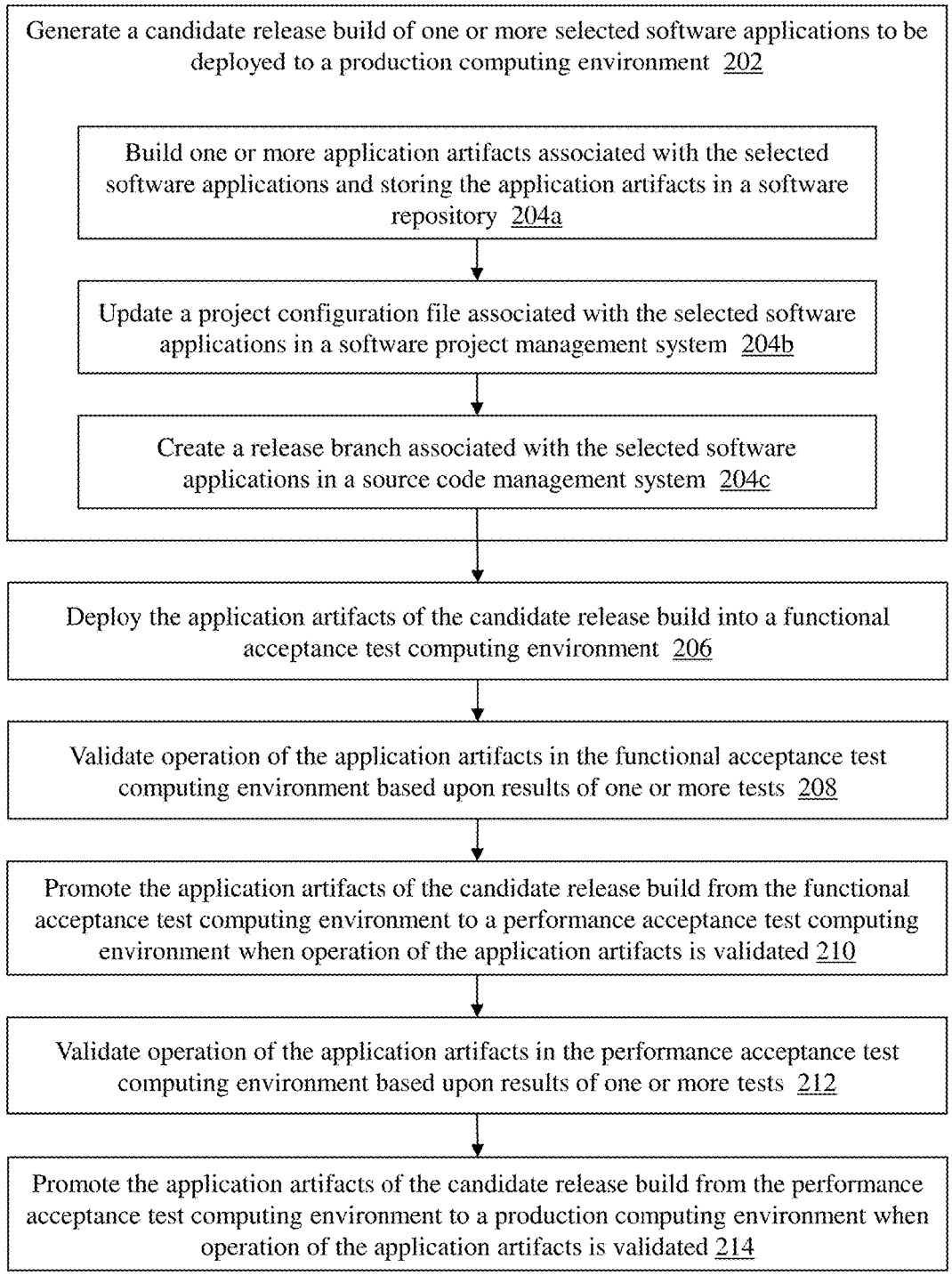
FIG. 2 is a flow diagram of a computerized method of automatic release preparation and deployment for software applications.
Figure 3A:
FIG. 3A is a diagram of an exemplary graphical user interface provided by a UI module to a client computing device for creation of an application release candidate build.
Figure 3B:
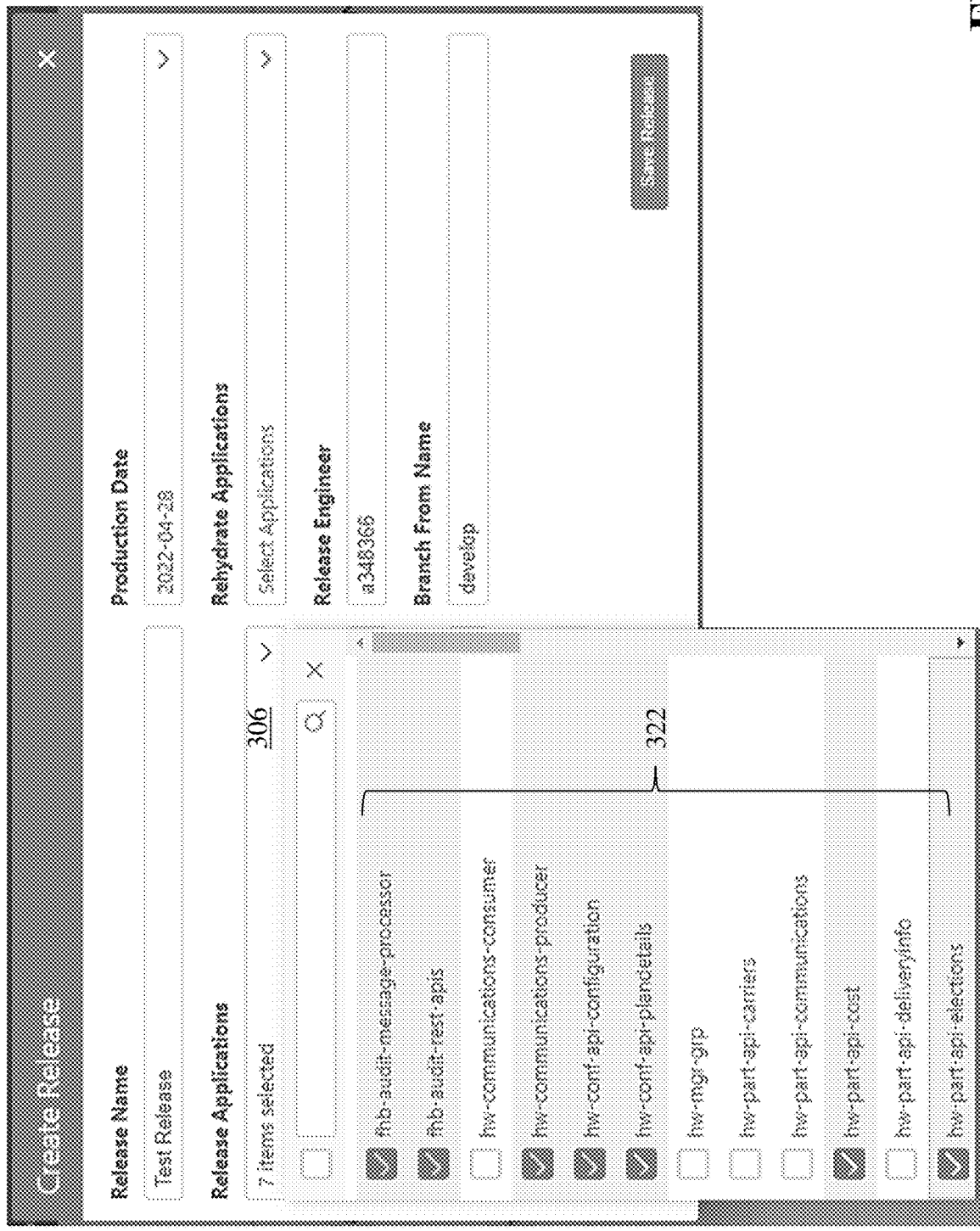
FIG. 3B is a diagram of an exemplary graphical user interface showing the software application selection menu.

FIG. 2 is a flow diagram of a computerized method 200 of automatic release preparation and deployment for software applications, using system 100 of FIG. 1. Data collection agent module 110 of server computing device 106 generates (step 202) a candidate release build of one or more selected software applications to be deployed to a production computing environment (e.g., environment 130). In order to generate the candidate release build, a user at client device 102 connects to UI module of server computing device 106, which provides a graphical user interface screen to enable the user to create an application release candidate build. FIGS. 3A and 3B are diagrams of exemplary graphical user interface screens provided by UI module 108 to client computing device 102 for creation of an application release candidate build. As shown in FIG. 3A, the UI 300 provides fields for data entry and/or selection, including:

- Release Name (302)—an identifier assigned to the candidate release build by the user of client device 102;
- Production Date (304)—the date on which the candidate release build is scheduled for promotion to production computing environment 130 for availability to end users;
- Release Applications (306)—a selection of the software applications (and/or modules, submodules, other components, etc.) to be included in the candidate release build;
- Rehydrate Applications (308)—a selection of the software applications to be rehydrated as part of the candidate release build;
- Release Coordinator (310)—an identifier (e.g., employee ID) of the developer assigned as the release coordinator for the build;
- Release Engineer (312)—an identifier (e.g., employee ID) of the developer assigned as the release engineer for the build;
- Release Type (314)—a selection of the frequency at which subsequent versions of the candidate release build will be compiled, tested, and promoted to the production environment;
- Branch From Name (316)—an identifier associated with the codebase (e.g., as identified in source code hosting tool 116) from which the candidate release build is branched; and
- Branch Pattern (318)—an identifier for the name of the code branch corresponding to the candidate release build.

As mentioned above, the user at client computing device 102 can select one or more software applications to be included in the candidate release build via the Release Applications 306 input field. For example, the Release Applications 306 input field can be a drop-down menu that displays the list of eligible applications to be included in the build and enables the user to select one or more applications. FIG. 3B is a diagram of an exemplary graphical user interface showing the software application selection menu 322. As shown, menu 322 displays the application ID (e.g., 'fhb-audit-message-processor') for each of the eligible applications and the user can select a checkbox field next to each application identifier to be included in the candidate release build. Once the user has configured the candidate release build parameters and settings via the UI, the user can activate the Save Release button 320 which creates the candidate release build.

Turning back to FIG. 2, data collection agent module 110 receives the selection of the one or more software applications to be deployed to a production computing environment (e.g., environment 130) as selected by the user. In some embodiments, data collection agent module 110 can identify each software application selected by the user via the corresponding application ID. In some embodiments, the UI can provide a mechanism for the user to enter a change management ticket ID (e.g., instead of an application ID) and data collection agent module 110 can retrieve a list of application IDs from the change management ticket for selection by the user. This scenario may be useful in a case where a change management ticket is associated with changes to multiple different software applications.

In some embodiments, when generating the UI shown in FIGS. 3A and 3B, UI module 108 communicates via processing core module 114 with one or more of the ALM tools, such as source code hosting tool 116 and/or the artifact management tool 118, to identify a list of prospective software applications that are eligible to be included in a build and deployed to the production computing environment 130 (based on, e.g., a determination of development status, approval to deploy, etc.) and either transmit the list to client device 102 for selection by the user or automatically select one of the software applications on the list. For example, data collection agent module 110 can analyze development and/or deployment information contained in one or more of the ALM tools, such as a change management ticket generated by source code hosting tool 116, to determine that a given software application is eligible to be deployed to production computing environment 130. In this example, the change management ticket may indicate that the software application has been modified, with changes to the code recently checked in and validated by the development team. As a result, data collection agent module 108 can determine that the software application is eligible to be deployed to production computing environment 130 and provide the application ID to the user via the UI.

Figure 3C:
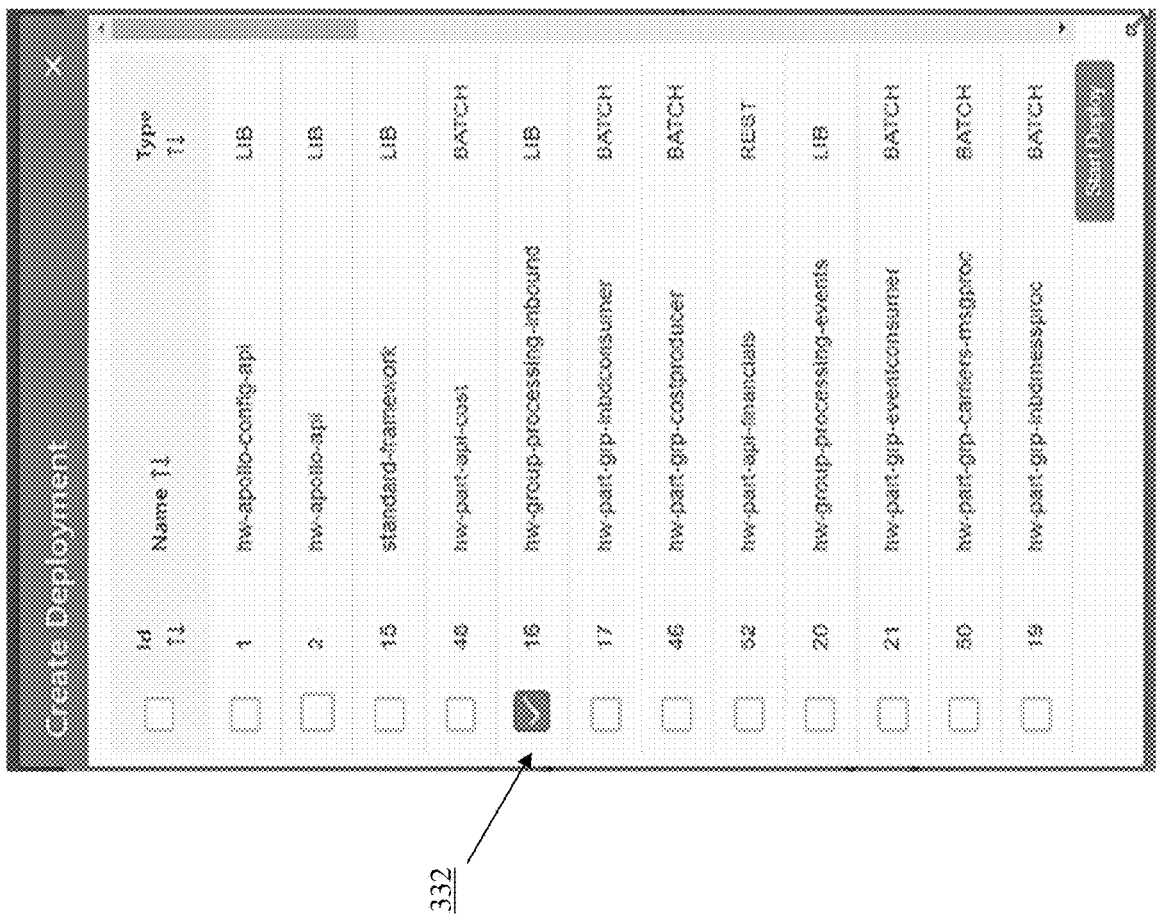
FIG. 3C is a diagram of an exemplary graphical user interface showing the app/component selection menu for a software deployment.

In some embodiments, data collection agent module 110 automatically calculates a list of apps and components (e.g., libraries or other reusable components) to be built based upon the user selection(s) as described above as well as on a development status of the project. As an example, the first build in a given software release typically will include all of the apps and components in the list. However, when a bug fix is implemented on a specific component, the user at client device 102 could select just the component where the bug fix is implemented. FIG. 3C is a diagram of an exemplary graphical user interface showing the app/component selection menu 330 for a software deployment. In this example, the user may have fixed a defect in a specific library, 'hw-group-processing-inbound' (LIB, id=16). As shown in FIG. 3C, the user at client device 102 has selected only this component 332 in the displayed UI. Based on the user selection, data collection agent module 110 determines that when this particular library is rebuilt, two other components ('hw-part-grp-inbdconsumer' (BATCH, id=17); 'hw-part-grp-inbdproducer' (deployable application)) also need to be rebuilt. Module 110 selects all of these components for inclusion in the build and deployment process.

Figure 4:
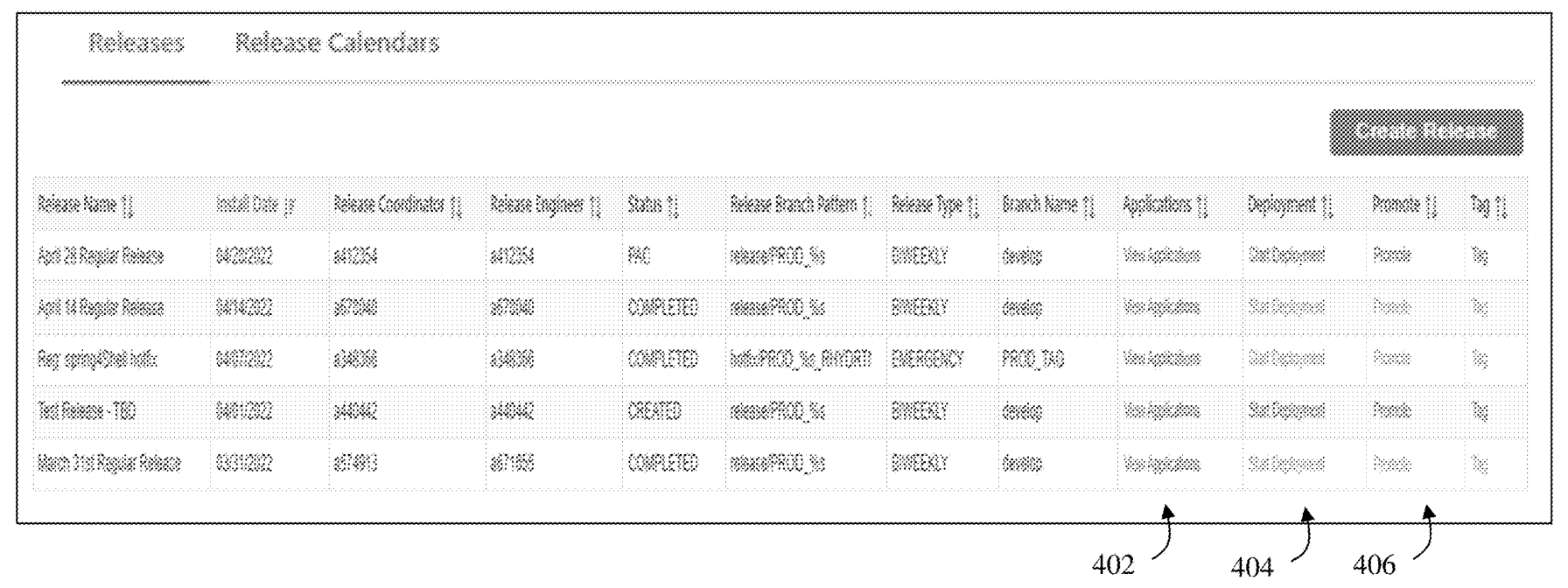

Once the candidate release build parameters are set, the candidate release build can be reviewed by the user of client computing device 102 via a build dashboard user interface screen. FIG. 4 is a diagram of an exemplary candidate release build dashboard graphical user interface provided by UI module 108 to client computing device 102 for management and initiation of candidate release build deployment. As shown in FIG. 4, the dashboard UI includes a table listing certain attributes for each candidate release build (including builds already released to production). The dashboard UI also comprises, for each build: a) link 402 that when activated displays the list of applications included in the build; b) link 404 that, when activated, initiates deployment of the associated release build to one or more testing environments; and c) link 406 that, when activated, automatically promotes the associated release build from one computing environment to another (e.g., from a testing environment to production environment). The user at client computing device 102 can activate these links to carry out one or more operations associated with the candidate release build.

For example, the user can initiate deployment of the "April 28 Regular Release" build by clicking the 'Start Deployment' link in the Deployment column of the table. Processing core module 114 receive the request to initiate build deployment from client computing device 102 via UI module 108, and module 114 can perform several operations to generate the build for deployment to one or more testing computing environments, such as environments 126a, 126b, 128a, and/or 128b. To generate the release build, processing core module 114 builds (step 204a) one or more application artifacts associated with the selected software applications and stores the application artifacts in a software repository. In some embodiments, processing core module 114 retrieves data elements from source code management tool 116 and builds release candidate application artifacts (e.g., binaries, libraries, metadata, dependencies, resources, etc.) associated with each of the selected software applications, along with the source code files for those applications. In some embodiments, processing core module 114 also establishes relationships between the selected software applications and corresponding libraries for creation of the build. For example, module 114 can determine that one or more of the selected software applications use one or more libraries based upon, e.g., data and/or metadata stored in source code management tool 116. Module 114 can extract this data and associate the libraries with the corresponding software applications when generating the candidate release build and the application artifacts. Processing core module 114 can store the application artifacts for the candidate release build in artifact management tool 118.

Processing core module 114 updates (step 204b) a project configuration file associated with the selected software applications in a software project management system (i.e., project management tool 120). In some embodiments, the project configuration file is a Project Object Model (POM) file (e.g., pom.xml) used by Apache Maven to build the selected software applications Module 114 can automatically update the POM file(s) associated with the selected software applications, including changes to the project configuration details (e.g., dependencies, build profile, etc.) in the POM based upon the selected applications, when generating the candidate release build.

Processing core module 114 also creates (step 204c) a release branch associated with the selected software applications in a source code management system (e.g., source code management tool 116. In some embodiments, module 114 transmits instructions to source code management tool 116 to create a release branch for each of the selected software applications (e.g., based off of a master branch or other development branch), including assigning a name or title to the created release branch. In some embodiments, module 114 uses the Branch From Name 316 and Branch Pattern 318 data (as entered by the user in FIG. 3A) to create the release branch in source code management tool 116.

In some embodiments, processing core module 114 can determine whether the candidate release build is successfully generated or whether one or more errors occurred during creation of the candidate release build. For example, when building one or more of the application artifacts associated with the selected software applications, module 114 may determine that the building of one or more artifacts has failed. The failure may be attributable to any number of different issues, including but not limited to, source code errors, compiler errors, data retrieval and/or network communication errors, and so forth. In the event that one or more of the application artifacts cannot be built, module 114 can be configured to terminate the generation of the candidate release build. In some embodiments, module 114 also generates a notification message for transmission to a client computing device (e.g., device 102) when generation of the candidate release build is terminated—in order to inform the user that the candidate release build is unable to be generated and providing information for the user to determine what may be causing the issues and attempt to initiate another generation of the candidate release build.

Once the candidate release build is successfully generated by processing core module 114, build deployment tool 112 deploys (step 206) the application artifacts of the candidate release build (including any executables, libraries, binaries, files, and the like) into a functional acceptance test computing environment (i.e., FAC test environment 128a). Generally, functional acceptance test computing environment 128a provides computing resources for deployment of one or more software applications in order to execute functional acceptance testing on the software applications. Generally, functional acceptance testing comprises a process to assess whether the software application works appropriately for end users (i.e., user acceptance testing) and/or meets necessary business objectives (i.e., business acceptance testing) or regulatory requirements (e.g., regulations/compliance acceptance testing). In some embodiments, the candidate release build is deployed as one or more software container images (e.g., Docker™ container images) executed in environment 128a for the purpose of testing the functionality of the software applications.

Upon deployment to FAC test computing environment 128a, build validation module 112 executes one or more tests against the application artifacts to validate (step 208) operation of the application artifacts in FAC computing environment 128a—such as determining whether the functionality of the application artifacts works appropriately and meets all goals or requirements. For example, build validation module 112 can execute one or more test scripts for certain functions or features of the software applications that duplicate or closely match the operation of the software applications by end users in a production environment. In some embodiments, build validation module 112 is a test automation platform configured to automatically execute tests and test scripts against the software application artifacts installed in FAC computing environment 128a. Exemplary test automation platforms include, but are not limited to, Selenium™ (available at selenium.dev) and Sahi™ Pro (available at sahipro.com). Build validation module 112 can capture test results associated with execution of the test scripts—such as test execution logs and error handling routines—and analyze the test results (and/or transmit the test results to a remote computing device for analysis by a developer or quality assurance technician) to identify whether operation of the application artifacts can be validated. In some embodiments, validation of the artifact operation includes determining that no errors occurred during testing of the application artifacts in FAC test environment 128a. When build validation module 112 determines that the application artifacts cannot be validated due to one or more errors during testing, module 112 can generate a notification message for transmission to a client computing device (e.g., device 102) in order to inform the user that the candidate release build has encountered errors during functional acceptance testing and providing information for the user to determine what may be causing the issues and to attempt to resolve them.

When build validation module 112 determines that testing of the application artifacts in environment 128a is successful, build validation module 112 can transmit this indication to build deployment tool 112 to continue with the production deployment process. Build deployment tool 112 promotes (step 210) the application artifacts from FAC test environment 128*a* to PAC test computing environment 128*b*. Generally, PAC test computing environment 128*b* provides computing resources for deployment of one or more software applications in order to execute performance acceptance testing on the software applications. Generally, performance acceptance testing comprises a process to verify that the software application's performance (e.g., response time, scalability, etc.) is within desired parameters—this may also include security acceptance testing (e.g., verifying the software is secure against attacks and does not contain vulnerabilities) and/or regression acceptance testing (e.g., verifying that changes made to the software do not negatively affect existing unchanged features). In some embodiments, the candidate release build is deployed as one or more software container images (e.g., Docker™ container images) executed in environment 128*b* for the purpose of testing the functionality of the software applications.

Upon deployment to PAC computing environment 128*b*, build validation module 112 executes one or more tests against the application artifacts to validate (step 212) operation of the application artifacts in functional acceptance test computing environment 128*a*—such as determining whether the performance of the application is within acceptable limits for deployment to the production environment. For example, build validation module 112 can execute one or more test scripts for certain functions or features of the software applications that duplicate or closely match the operation of the software applications by end users in a production environment. Build validation module 112 can capture test results associated with execution of the test scripts—such as test execution logs, performance monitoring, database/memory usage, and error handling routines—and analyze the test results (and/or transmit the test results to a remote computing device for analysis by a developer or quality assurance technician) to identify whether operation of the application artifacts can be validated. In some embodiments, validation of the artifact operation includes determining that no errors occurred during testing of the application artifacts in PAC test environment 128*b*. In some embodiments, validation of the artifact operation includes determining that the performance (e.g., processor usage, latency, memory usage, response time, etc.) during testing of the application artifacts in PAC test environment 128*b* is within a desired tolerance. When build validation module 112 determines that the application artifacts cannot be validated due to one or more errors during testing or performance degradation, module 112 can generate a notification message for transmission to a client computing device (e.g., device 102) in order to inform the user that the candidate release build cannot be validated during performance acceptance testing and providing information for the user to determine what may be causing the issues and to attempt to resolve them.

It should be appreciated that, in some embodiments, processing core module 114 can initiate deployment of the application artifacts for the candidate release build to one or more of functional test computing environment 126*a* and/or integration test computing environment 126*b* prior to promoting the candidate release build to FAC test environment 128*a* (although this step is optional). Generally, functional testing comprises a process to validate the functioning and operation of each feature and/or module of the software individually against corresponding functional requirements and/or specifications that are defined during the development process. Integration testing comprises a process to validate the functioning and operation of the features and/or modules of the software application when they are combined as a group. In some embodiments, the candidate release build is deployed as one or more software container images (e.g., Docker™ container images) executed in environment 1226*a* for the purpose of testing the functionality of the software applications.

Upon deployment to functional test computing environment 126*a*, build validation module 112 executes one or more tests against the application artifacts to validate operation of the application artifacts in functional test computing environment 126*a*—such as determining that individual modules, features, or components of the selected software applications are working properly and performing according to expectations. For example, build validation module 112 can execute one or more test scripts for certain functions or features of the software applications that duplicate or closely match the operation of the software applications by end users in a production environment. Build validation module 112 can capture test results associated with execution of the test scripts—such as test execution logs, outputs, and error handling routines—and analyze the test results (and/or transmit the test results to a remote computing device for analysis by a developer or quality assurance technician) to identify whether operation of the application artifacts can be validated. In some embodiments, validation of the artifact operation includes determining that no errors occurred during testing of the application artifacts in functional test environment 126*a*. When build validation module 112 determines that the application artifacts cannot be validated due to one or more errors during testing, module 112 can generate a notification message for transmission to a client computing device (e.g., device 102) in order to inform the user that the candidate release build cannot be validated during functional testing and providing information for the user to determine what may be causing the issues and to attempt to resolve them.

When build validation module 112 determines that testing of the application artifacts in functional test environment 126*a* is successful, build validation module 112 can transmit this indication to build deployment tool 112 to continue with the production deployment process. Build deployment tool 112 can promote the application artifacts from functional test environment 126*a* to integration test computing environment 126*b*. Generally, integration test computing environment 126*b* provides computing resources for deployment of one or more software applications in order to execute integration testing on the software applications. In some embodiments, the candidate release build is deployed as one or more software container images (e.g., Docker™ container images) executed in integration test environment 126*b* for the purpose of testing the functionality of the software applications as a group.

Upon deployment to integration test computing environment 126*b*, build validation module 112 executes one or more tests against the application artifacts to validate operation of the application artifacts in integration test computing environment 126*b*—such as determining that the selected software applications are integrated properly to perform specific tasks and workflows. For example, build validation module 112 can execute one or more test scripts for certain functions or features of the software applications that duplicate or closely match the operation of the software applications by end users in a production environment. Build validation module 112 can capture test results associated with execution of the test scripts—such as test execution logs, outputs, and error handling routines—and analyze the test results (and/or transmit the test results to a remote computing device for analysis by a developer or quality assurance technician) to identify whether operation of the application artifacts can be validated. In some embodiments, validation of the artifact operation includes determining that no errors occurred during testing of the application artifacts in integration test environment 126b. When build validation module 112 determines that the application artifacts cannot be validated due to one or more errors during testing, module 112 can generate a notification message for transmission to a client computing device (e.g., device 102) in order to inform the user that the candidate release build cannot be validated during integration testing and providing information for the user to determine what may be causing the issues and to attempt to resolve them.

Figure 5:
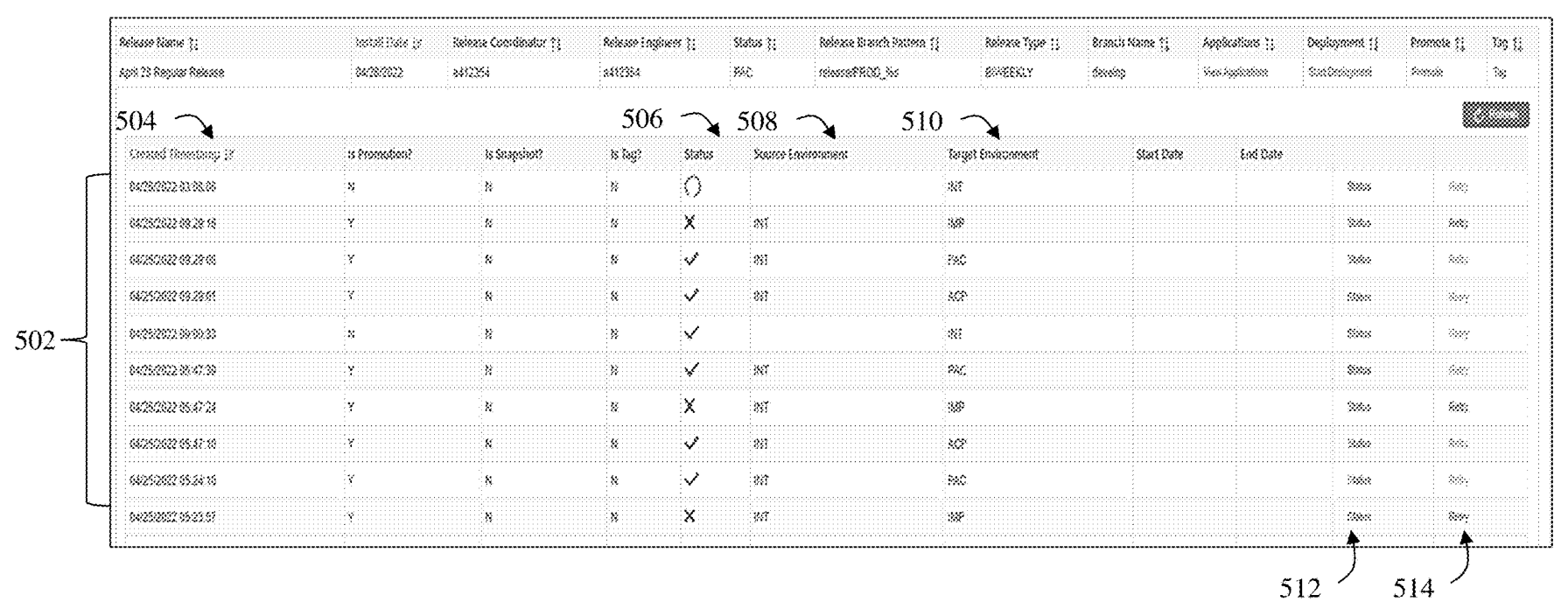

During the testing and promotion process for a candidate release build, UI module 108 advantageously provides an overview of the various deployment, testing, and promotion activities for a given candidate release build. FIG. 5 is a diagram of an exemplary graphical user interface provided by UI module 108 to client computing device 102 for tracking of deployment, testing, and promotion activities for a candidate release build. The user at client computing device 102 can select one of the candidate release builds (from the interface of FIG. 4) and UI module 108 displays a list 502 of deployment, testing, and promotion activities for the build. Among other details, the list of activities can include a timestamp for the activity 504, a status of the activity 506 (where successful completion is denoted by a checkmark, unsuccessful completion is denoted by an X, and in-process activity is denoted by a circle), source environment 508 (i.e., the computing environment from which the application build is being promoted/deployed), and target environment 510 (i.e., the computing environment to which the application build is being promoted/deployed). Using this interface, the user at client computing device 102 can easily view which build activities completed successfully and which build activities had problems in order to quickly identify specific build activities that may require investigation and remediation.

Figure 6:
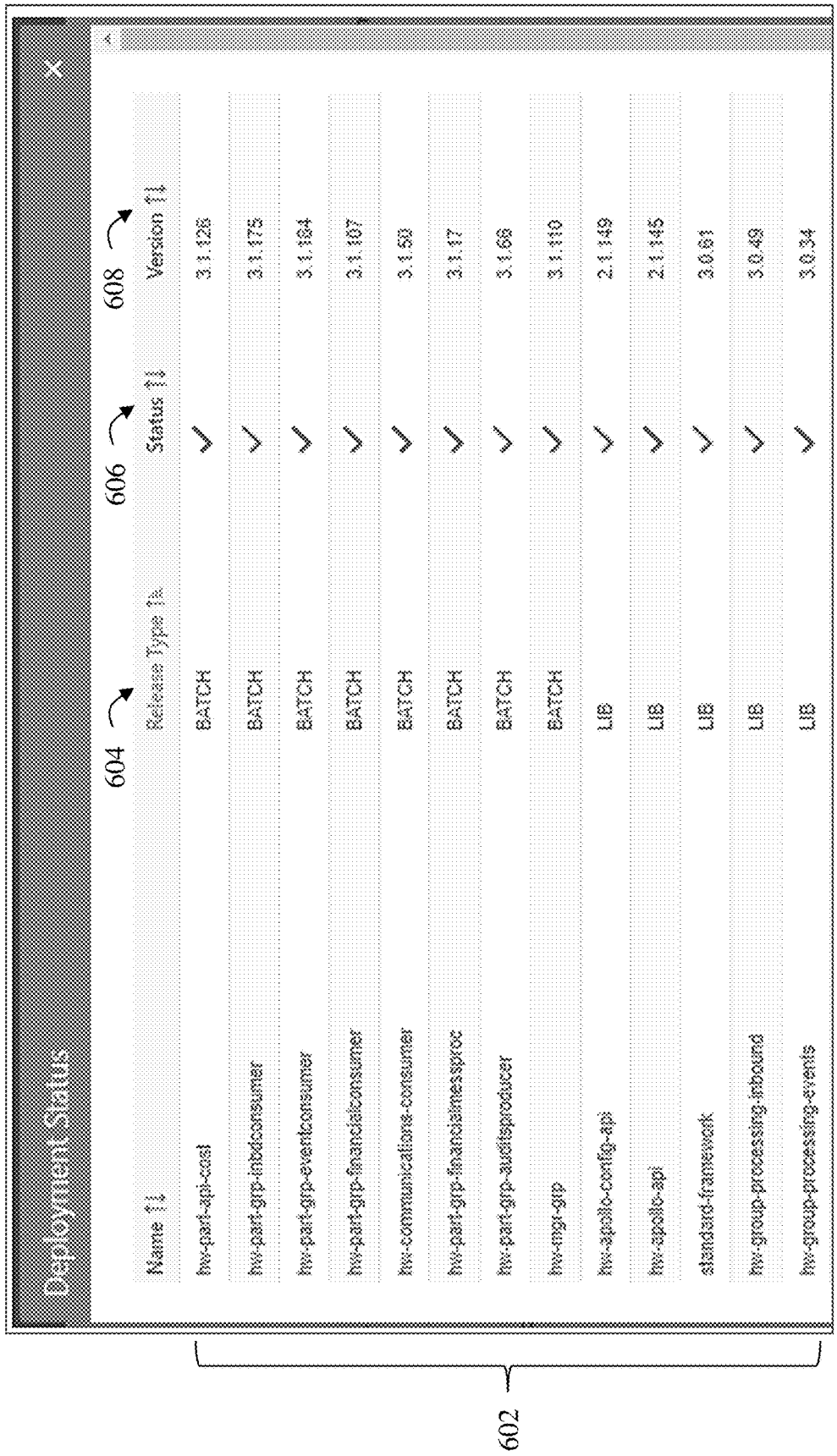
FIG. 6 is a diagram of an exemplary graphical user interface provided by a UI module to a client computing device for tracking of individual software application status during deployment, testing, and promotion of the candidate release build.

Each activity in list 502 also includes a Status link 512 and a Retry link 514. Upon activation of Status link 512, UI module 108 displays a list of each software application included in the candidate release build along with details about the status of the software application. FIG. 6 is a diagram of an exemplary graphical user interface provided by UI module 108 to client computing device 102 for tracking of individual software application status during deployment, testing, and promotion of the candidate release build. As shown in FIG. 6, the user interface displays a list 602 of applications contained in the release build, including information such as Release Type 604, Status 606 (where successful completion is denoted by a checkmark, unsuccessful completion is denoted by an X, and in-process activity is denoted by a circle) and Version 608. Using this interface, the user at client computing device 102 can determine which application(s) did not successfully get incorporated into the build and/or did not successfully complete the testing or promotion process. In addition, the user can identify specific version numbers of applications included in the candidate release build to confirm whether the version is accurate or should be replaced with a different version of the application.

Upon activation of Retry link 514, processing core module 114 can attempt to initiate the corresponding release activity again. For example, the release activity can be promotion of the build from functional acceptance testing to performance acceptance testing, and the most recent attempt to complete the promotion did not succeed due to an application error during testing. Module 114 can automatically initiate the process to promote the candidate release build from environment 128a to environment 128b. If the promotion is successful, module 114 can transmit a notification message to client computing device 102 (via UI module 108) that informs the user of client computing device 102.

When build validation module 112 determines that testing of the application artifacts in FAC test environment 128a and PAC test environment 128b is successful, build validation module 112 can transmit this indication to build deployment tool 112 to continue with the production deployment process. Build deployment tool 112 promotes (step 214) the application artifacts from PAC test environment 128b (or, in some embodiments, FAC test environment 128a) to production computing environment 130. In some embodiments, processing core module 114 receives an indication from build validation module 112 that testing in performance acceptance test computing environment 128b has validated the operation of the application artifacts. Module 114 can then mark the corresponding application artifacts in artifact management tool 118 as ready for deployment to production computing environment 130. However, when build validation module 112 determines that testing of the application artifacts in environment 128b is not successful and operation of the artifacts cannot be validated, processing core module 114 marks the application artifacts in artifact management tool 118 as not ready for deployment to the production computing environment. Module 114 also prevents promotion of the application artifacts to production computing environment 130.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automatic release preparation and deployment for software applications, the method comprising:
   generating, by a server computing device, a candidate release build of one or more selected software applications to be deployed to a production computing environment, including:
      receiving indicia from a client computing device, the indicia comprising a change management ticket identifier (IDs) associated with a change management ticket in a project management platform,
      determining a plurality of application identifiers (IDs) each corresponding to a different software application referenced in the change management ticket ID,
      analyzing one or more indicators in the change management ticket to determine that the software applications referenced in the change management ticket have been modified and that code changes made to each of the software applications referenced by the change management ticket have been checked in and validated in a source code hosting tool by a development team, building one or more application artifacts associated with the plurality of application IDs and storing the application artifacts in a software repository, updating a project configuration file associated with the plurality of application IDs in a software project management system, and creating a release branch associated with the plurality of application IDs in a source code management system;

deploying, by the server computing device, the application artifacts of the candidate release build into a functional acceptance test computing environment;

validating, by the server computing device, operation of the application artifacts in the functional acceptance test computing environment based upon results of one or more tests executed against the application artifacts in the functional acceptance test computing environment;

when the operation of the application artifacts in the functional acceptance test computing environment is validated:

promoting, by the server computing device, the application artifacts of the candidate release build from the functional acceptance test computing environment to a performance acceptance test computing environment;

validating, by the server computing device, operation of the application artifacts in the performance acceptance test computing environment based upon results of one or more tests executed against the application artifacts in the performance acceptance test computing environment; and promoting, by the server computing device, the application artifacts from the performance acceptance test computing environment to a production computing environment when the operation of the application artifacts is validated in the performance acceptance test computing environment, including marking the application artifacts as ready for deployment to the production computing environment; and when the operation of the application artifacts in the functional acceptance test computing environment is not validated:

preventing, by the server computing device, deployment of the application artifacts to the performance acceptance test computing environment;

displaying, by the server computing device, on the client computing device, a user interface comprising a status field associated with each of the application artifacts that indicates whether the application artifact is not validated; receiving, by the server computing device, input from the client computing device to retry the validation of the operation of the application artifacts in the functional acceptance test computing environment, wherein a version of at least one of the application artifacts is changed; and validating, by the server computing device, the operation of the application artifacts in the functional acceptance test computing environment based upon results of one or more additional tests executed against the application artifacts in the functional acceptance test computing environment.

2. The method of claim 1, wherein a selection of the software applications to be deployed to the production computing environment is received from the client computing device.

3. The method of claim 2, wherein generation of the candidate release build of the selected software applications is initiated automatically upon receiving the selection of the software applications from the client computing device.

4. The method of claim 1, further comprising deploying, by the server computing device, the application artifacts of the candidate release build into a functional integration test computing environment prior to deployment into the functional acceptance test computing environment.

5. The method of claim 4, further comprising validating, by the server computing device, operation of the application artifacts in the functional integration test computing environment based upon results of one or more tests executed against the application artifacts in the functional integration test computing environment.

6. The method of claim 5, further comprising preventing, by the server computing device, deployment of the application artifacts to the functional acceptance test computing environment when the operation of the application artifacts in the functional integration test computing environment is not validated.

7. The method of claim 6, wherein the operation of the application artifacts in the functional integration test computing environment is not validated when one or more errors occurred during the tests executed against the application artifacts in the functional integration test computing environment.

8. The method of claim 1, further comprising marking, by the server computing device, the application artifacts as not ready for deployment to the production computing environment and preventing promotion of the application artifacts to the production computing environment when the operation of the application artifacts in the performance acceptance test computing environment is not validated.

9. The method of claim 8, wherein the operation of the application artifacts in the performance acceptance test computing environment is not validated when one or more errors occurred during the tests executed against the application artifacts in the performance acceptance test computing environment.

10. The method of claim 1, wherein building one or more application artifacts associated with the plurality of application IDs and storing the application artifacts in the software repository comprises:

identifying one or more application code objects for software applications referenced by the plurality of application IDs;

determining a relationship between one or more of the application code objects and one or more libraries associated with the software applications referenced by the plurality of application IDs; and integrating the application code objects and the related libraries into one or more application artifacts.

11. The method of claim 1, wherein generation of the candidate release build is terminated when building of one or more of the application artifacts associated with the selected software applications fails.

12. The method of claim 11, further comprising generating, by the server computing device, a notification message for transmission to the client computing device when generation of the candidate release build is terminated.

13. The method of claim 1, wherein promoting the application artifacts from the performance acceptance test computing environment to the production computing environment comprises transferring one or more files of the application artifacts to a computing device in the production computing environment and making functionality of the selected software applications available to one or more remote computing devices.

14. A system for automatic release preparation and deployment for software applications, the system comprising a server computing device with a memory that stores computer-executable instructions and a processor that executes the computer-executable instructions to:
generate a candidate release build of one or more selected software applications to be deployed to a production computing environment, including:
receiving indicia from a client computing device, the indicia comprising a change management ticket identifier (ID) associated with a change management ticket in a project management platform,
determining a plurality of application identifiers (IDs) each corresponding to a different software application referenced in the change management ticket ID,
analyzing one or more indicators in the change management ticket to determine that the software applications referenced in the change management ticket have been modified and that code changes made to each of the software applications referenced by the change management ticket have been checked in and validated in a source code hosting tool by a development team,
building one or more application artifacts associated with the plurality of application IDs and storing the application artifacts in a software repository,
updating a project configuration file associated with the plurality of application IDs in a software project management system, and
creating a release branch associated with the plurality of application IDs in a source code management system;
deploy the application artifacts of the candidate release build into a functional acceptance test computing environment;
validate operation of the application artifacts in the functional acceptance test computing environment based upon results of one or more tests executed against the application artifacts in the functional acceptance test computing environment;
when the operation of the application artifacts in the functional acceptance test computing environment is validated:
promote the application artifacts of the candidate release build from the functional acceptance test computing environment to a performance acceptance test computing environment;
validate operation of the application artifacts in the performance acceptance test computing environment based upon results of one or more tests executed against the application artifacts in the performance acceptance test computing environment; and
promote the application artifacts from the performance acceptance test computing environment to a production computing environment when the operation of the application artifacts is validated in the performance acceptance test computing environment, including marking the application artifacts as ready for deployment to the production computing environment; and
when the operation of the application artifacts in the functional acceptance test computing environment is not validated:
prevent deployment of the application artifacts to the performance acceptance test computing environment;
display on the client computing device a user interface comprising a status field associated with each of the application artifacts that indicates whether the application artifact is not validated;
receive input from the client computing device to retry the validation of the operation of the application artifacts in the functional acceptance test computing environment, wherein a version of at least one of the application artifacts is changed; and
validate the operation of the application artifacts in the functional acceptance test computing environment based upon results of one or more additional tests executed against the application artifacts in the functional acceptance test computing environment.

15. The system of claim 14, wherein a selection of the software applications to be deployed to the production computing environment is received from the client computing device.

16. The system of claim 15, wherein generation of the candidate release build of the selected software applications is initiated automatically upon receiving the selection of the software applications from the client computing device.

17. The system of claim 14, wherein the server computing device deploys the application artifacts of the candidate release build into a functional integration test computing environment prior to deployment into the functional acceptance test computing environment.

18. The system of claim 17, wherein the server computing device validates operation of the application artifacts in the functional integration test computing environment based upon results of one or more tests executed against the application artifacts in the functional integration test computing environment.

19. The system of claim 18, wherein the server computing device prevents deployment of the application artifacts to the functional acceptance test computing environment when the operation of the application artifacts in the functional integration test computing environment is not validated.

20. The system of claim 19, wherein the operation of the application artifacts in the functional integration test computing environment is not validated when one or more errors occurred during the tests executed against the application artifacts in the functional integration test computing environment.

21. The system of claim 14, wherein the server computing device marks the application artifacts as not ready for deployment to the production computing environment and prevents promotion of the application artifacts to the production computing environment when the operation of the application artifacts in the performance acceptance test computing environment is not validated.

22. The system of claim 21, wherein the operation of the application artifacts in the performance acceptance test computing environment is not validated when one or more errors occurred during the tests executed against the application artifacts in the performance acceptance test computing environment.

23. The system of claim 14, wherein building one or more application artifacts associated with the plurality of application IDs and storing the application artifacts in the software repository comprises:

identifying one or more application code objects for software applications referenced by the plurality of application IDs;

determining a relationship between one or more of the application code objects and one or more libraries associated with the software applications referenced by the plurality of application IDs; and integrating the application code objects and the related libraries into one or more application artifacts.

24. The system of claim 14, wherein generation of the candidate release build is terminated when building of one or more of the application artifacts associated with the selected software applications fails.

25. The system of claim 24, wherein the server computing device generates a notification message for transmission to the client computing device when generation of the candidate release build is terminated.

26. The system of claim 14, wherein promoting the application artifacts from the performance acceptance test computing environment to the production computing environment comprises transferring one or more files of the application artifacts to a computing device in the production computing environment and making functionality of the selected software applications available to one or more remote computing devices.

* * * * *